US007142857B1

(12) United States Patent
Calabrese et al.

(10) Patent No.: US 7,142,857 B1
(45) Date of Patent: Nov. 28, 2006

(54) APPARATUS, METHOD AND SYSTEM FOR MAINTAINING CALL CONTROL AT A GATEWAY MOBILE SWITCHING CENTER UTILIZING A PACKET NETWORK

(75) Inventors: Robert Thomas Calabrese, Naperville, IL (US); Thomas Edward Hudepohl, Geneva, IL (US); Douglas Harvey Riley, Naperville, IL (US); Robin Jeffrey Thompson, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/558,613

(22) Filed: Apr. 26, 2000

(51) Int. Cl.
H04Q 7/20 (2006.01)
(52) U.S. Cl. .................. 455/436; 455/437; 455/438; 455/439; 370/912; 370/913
(58) Field of Classification Search ............. 379/93.23, 379/220.01, 142.01; 455/560, 432.1, 436, 455/437, 438, 439; 370/912, 913
See application file for complete search history.

(56) References Cited

U.S. PATENT DOCUMENTS

| 4,266,098 | A | * | 5/1981 | Novak .......................... 379/77 |
| 5,396,543 | A | * | 3/1995 | Beeson et al. .............. 455/560 |
| 5,724,411 | A | * | 3/1998 | Eisdorfer et al. ........ 379/93.23 |
| 5,953,331 | A | | 9/1999 | Duncan et al. |
| 5,999,521 | A | | 12/1999 | Thompson |
| 6,049,594 | A | * | 4/2000 | Furman et al. ............. 379/67.1 |
| 6,310,944 | B1 | * | 10/2001 | Brisebois et al. ...... 379/142.01 |

FOREIGN PATENT DOCUMENTS

EP 0 783 217 A2 7/1997

(Continued)

OTHER PUBLICATIONS

Anna Balakrishnan, "Wireless and Service Mobility", *1997 Annual Review of Communications*, pp. 859-865, 1997.

*Primary Examiner*—Bing Q. Bui (57) ABSTRACT

The apparatus, method and system embodiments of the present invention provide for maintaining call control at a gateway mobile switching center (MSC), for roaming mobile units, utilizing a packet network or link, such as an ATM link. The preferred system embodiment includes a gateway MSC, a serving MSC, and a base station having a wireless link with the roaming mobile unit. The gateway MSC includes a protocol handler for voice (PHV). For any given incoming call for the roaming mobile unit or outgoing call from the roaming mobile unit, the gateway MSC designates a specific address (or channel) on the PHV, referred to as a data link connection identifier (DLCI), for use as an address for voice packets to be received from the roaming mobile unit via the base station and serving MSC, and the base station also provides a base station packet address to the gateway MSC, for use as an address for voice packets to be received from the gateway MSC (through the serving MSC) for the roaming mobile unit, thereby creating a full duplex packet link. The packet link serves as a voice path between the base station, the serving MSC, and gateway MSC, with all communication to and from the roaming mobile unit routed through the gateway MSC. The gateway MSC thereby maintains all call control for the roaming mobile unit for the implementation of advanced calling features, such as call waiting and three-way calling. In the preferred embodiment, the DLCI is included as a new parameter for ANSI-41 compatible messages. In addition, new ANSI-41 compatible messages are also utilized, a Gateway Origination Request containing the base station packet address and a Gateway Origination Request Return Result containing the new DLCI parameter.

56 Claims, 7 Drawing Sheets

FOREIGN PATENT DOCUMENTS

| | | |
|---|---|---|
| EP | 0 883 316 A1 | 12/1998 |
| EP | 0 902 595 A2 | 3/1999 |
| WO | WO 96/42176 | 12/1996 |
| WO | WO 99/33250 | 7/1999 |

* cited by examiner

APPARATUS, METHOD AND SYSTEM FOR MAINTAINING CALL CONTROL AT A GATEWAY MOBILE SWITCHING CENTER UTILIZING A PACKET NETWORK

FIELD OF THE INVENTION

The present invention relates, in general, to mobile telecommunication systems and, more specifically, to an apparatus, method and system for maintaining call control at a gateway mobile switching center utilizing a packet network.

BACKGROUND OF THE INVENTION

In recent years, there has been an exponential growth in the use and provision of wireless telephony services, such as cellular and PCS services. With such growth, a mobile unit such as a cellular telephone may traverse different geographic regions, obtaining telecommunication services from a wide variety of service providers utilizing a wide variety of equipment.

In addition, with the advent of increasingly sophisticated mobile telecommunication services, there is a growing need to maintain control over calls to and from mobile units, such as cellular telephones, at a central location. Such central control is especially important for the implementation of advanced calling features such as call waiting, call forwarding on busy, and three-way calling. Such central control should also utilize advanced networking capability, such as use of packet networks such as asynchronous transfer mode ("ATM") packet networks or Internet protocol ("IP") packet networks.

As a consequence, a need remains for an apparatus, method and system to provide for maintaining call control, for both incoming and outgoing calls, at a designated mobile switching center, utilizing a packet network. The apparatus, method and system should also provide the capability to implement advanced calling features in a mobile environment, such as call waiting or three-way calling, without utilizing additional circuit switched network links such as trunk lines. The apparatus, method and system should also provide for increased network efficiency, increased ease of implementation of advanced calling features, conservation of circuit switched network resources, and capability of implementation in utilizing existing network equipment.

SUMMARY OF THE INVENTION

The apparatus, method and system embodiments of the present invention provide for maintaining call control at a gateway mobile switching center (MSC), for roaming mobile units, utilizing a packet network or link, such as an ATM link, for bearer traffic transport. The preferred system embodiment includes a gateway MSC, a serving MSC, and a base station having a wireless link with the roaming mobile unit. All incoming calls to the roaming mobile unit and outgoing calls from the roaming mobile unit are transmitted (or routed) through the gateway MSC, over a packet link created between the gateway MSC, the serving MSC, and the base station. The gateway MSC thereby maintains all call control for the roaming mobile unit for the implementation of advanced calling features, such as call waiting, call forwarding on busy, and three-way calling.

The gateway MSC includes a protocol handler for voice (PHV). For any given incoming call for the roaming mobile unit or outgoing call from the roaming mobile unit, the gateway MSC designates a specific address (or channel) on the PHV, referred to as a data link connection identifier (DLCI), for use as an address for voice packets to be received from the roaming mobile unit via the base station and serving MSC; the base station also provides a base station packet address to the gateway MSC, for use as an address for voice packets to be received from the gateway MSC (through the serving MSC) for the roaming mobile unit, thereby creating a full duplex packet link. The packet link provides or serves as a voice path between the base station, the serving MSC, and gateway MSC, with all communication to and from the roaming mobile unit routed through the gateway MSC. The gateway MSC thereby maintains all call control for the roaming mobile unit for the implementation of advanced calling features, such as call waiting and three-way calling.

In the preferred embodiment, the DLCI is included as a new parameter for ANSI-41 compatible messages, such as within Location Requests and Routing Requests. In addition, new ANSI-41 compatible messages are also utilized, a Gateway Origination Request containing the base station packet address and a Gateway Origination Request Return Result containing the new DLCI parameter.

Numerous other advantages and features of the present invention will become readily apparent from the following detailed description of the invention and the embodiments thereof, from the claims and from the accompanying drawings.

DETAILED DESCRIPTION OF THE INVENTION

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains to provide for maintaining call control at a designated mobile switching center, utilizing a packet network. In accordance with the present invention, an apparatus, method and system are provided which maintain call control, for both incoming and outgoing calls, at such a designated mobile switching center ("MSC"), referred to herein as a "gateway" MSC, utilizing a packet network. In the preferred embodiment, an ATM packet network is utilized to provide such call control at the gateway MSC, and to provide a packet link for bearer traffic between the gateway MSC and any serving MSC. As a consequence, in accordance with the present invention, advanced calling features, such as call waiting or three-way calling, may be implemented in a mobile environment without utilizing additional circuit switched network links such as trunk lines. The various embodiments of the present invention therefore provide for increased network efficiency, increased ease of implementation of advanced calling features, conservation of circuit switched network resources, and capability of implementation in utilizing existing network equipment.

Figure 1:
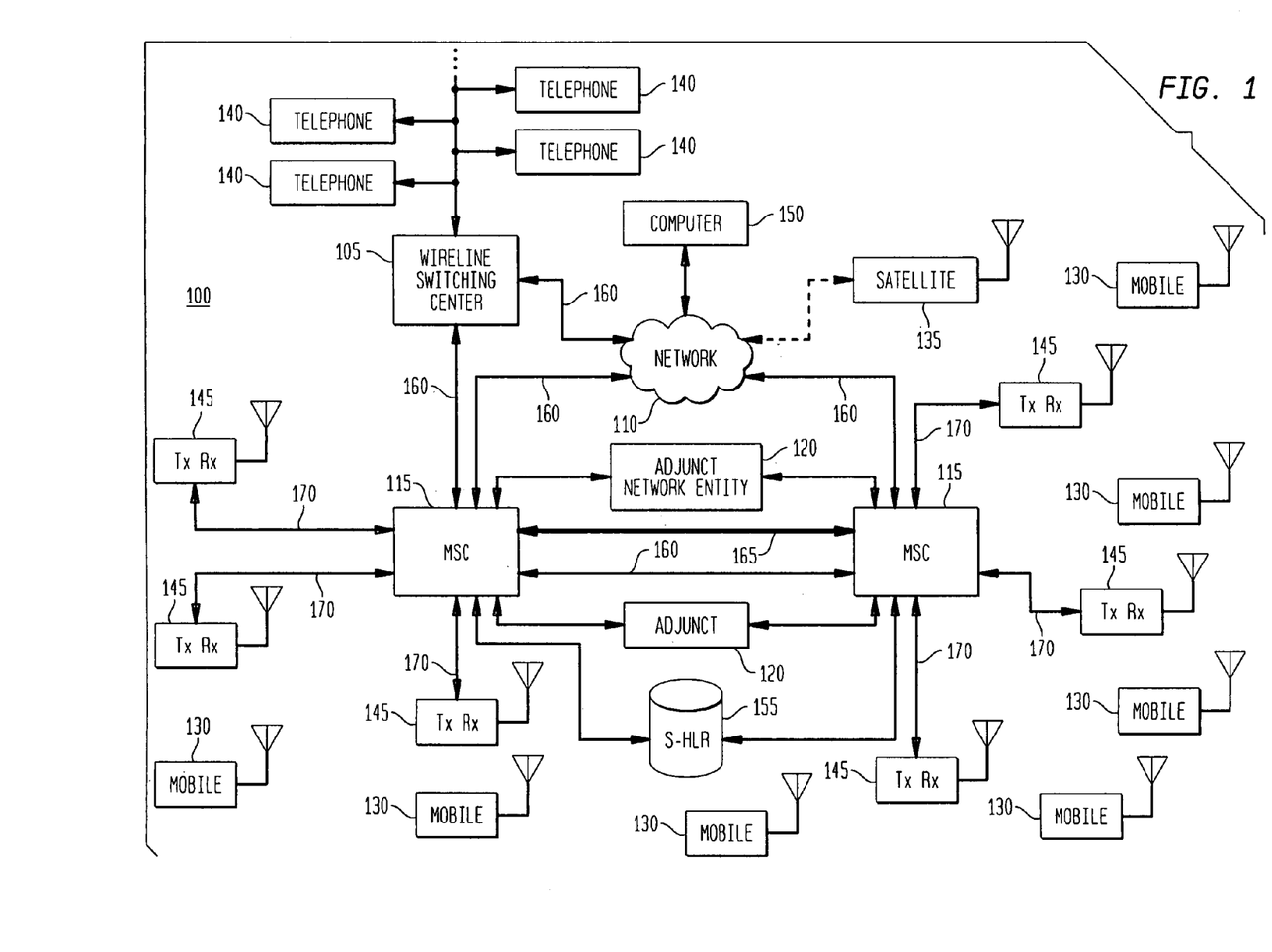
FIG. 1 is a block diagram illustrating a first system embodiment to maintain call control at a gateway mobile switching center utilizing a packet network in accordance with the present invention.
Figure 2:
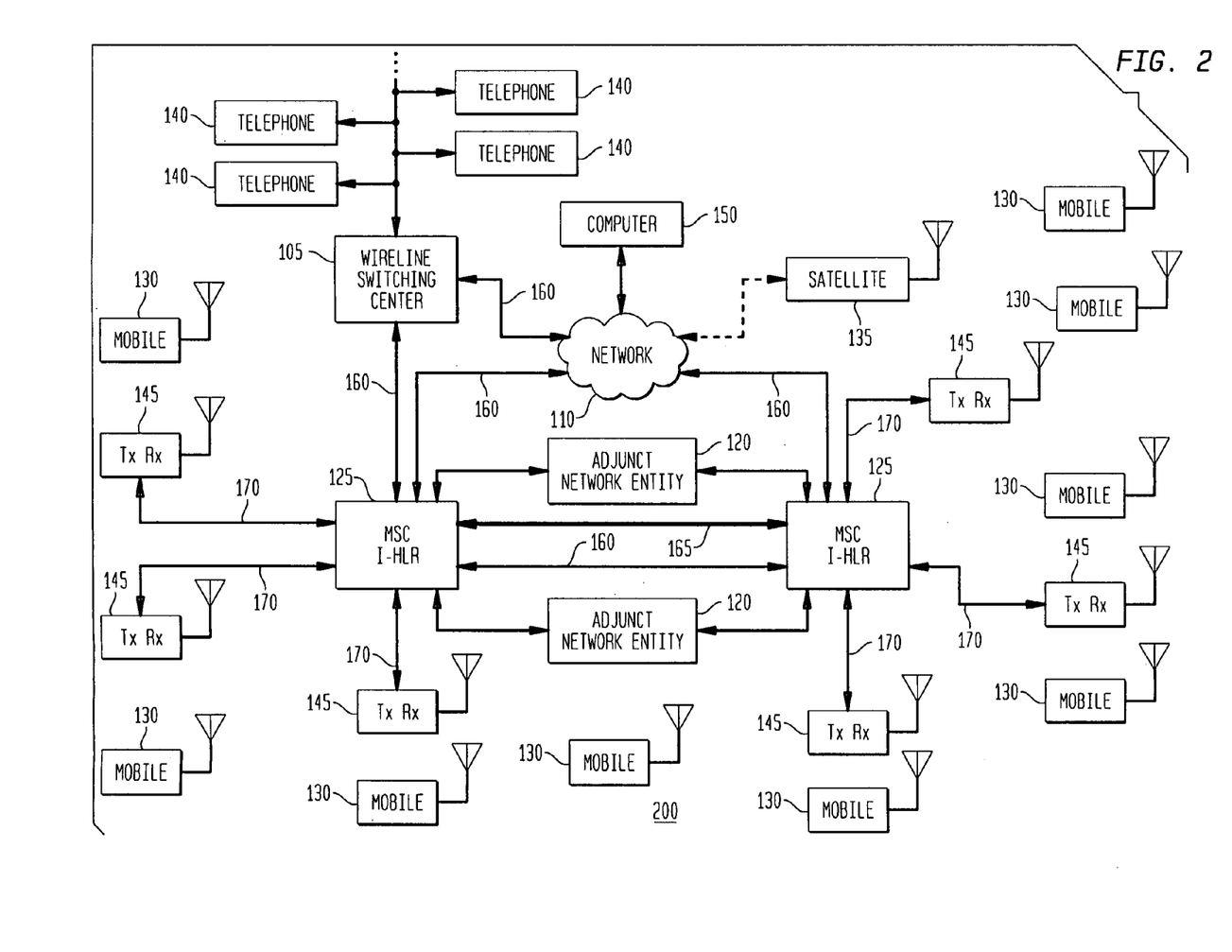
FIG. 2 is a block diagram illustrating a second system embodiment to maintain call control at a gateway mobile switching center utilizing a packet network in accordance with the present invention.

FIG. 1 is a block diagram illustrating a first system embodiment 100 to maintain call control at a gateway MSC utilizing a packet network in accordance with the present invention. FIG. 2 is a block diagram illustrating a second system embodiment 200 to maintain call control at a gateway mobile switching center utilizing a packet network in accordance with the present invention. The systems 100 includes one or more mobile switching centers ("MSCs") 115 (in FIG. 1) and 125 (in FIG. 2) and one or more wireline switching centers 105, which may also be connected via trunk and signaling lines 160 to each other and to a broader network 110, such as a public switched telephone network ("PSTN") or an integrated services digital network ("ISDN"), providing multiple telecommunication connections to other locations, such as providing a link to a computer 150 (or other internet connection) and a link to satellite 135, such as a telecommunication satellite.

As discussed in greater detail below, in accordance with the present invention, any of the MSCs 115 and 125 may function as a gateway MSC. Incoming calls to a mobile unit 130 will be routed and controlled by the gateway MSC. Outgoing calls which originate at a different, "serving" MSC (115 or 125) will be routed over an ATM link to the gateway MSC, to provide call control and advanced calling features, such as call waiting, call forwarding and three-way calling.

Referring to FIGS. 1 and 2, the systems 100 and 200 may also include one or more intelligent network devices referred to as adjunct network entities 120, such as a service control point ("SCP"), a service node ("SN"), an intelligent peripheral ("IP"). Another type of adjunct network entity implements database functionality, and is generally referred to as a home location register ("HLR"). As illustrated in FIG. 1, the HLR functionality is implemented utilizing stand-alone home location registers ("S-HLRs") 155. In contrast, in FIG. 2, the HLR functionality is implemented in an equivalent form, utilizing integrated home location registers ("I-HLRs"), which are integrated within the MSCs 125. The adjunct network entities 120 are preferably connected or coupled to a MSC 115 (or 125), utilizing either a packet-based or a circuit switched connection. The system 100 or 200 may also have a network (such as internet) connection to a computer 150 (or other network communication device). In the preferred embodiment, each MSC 115 or 125 also includes or is associated with a database referred to as a visitor location register ("VLR").

As indicated above, for the system 200 embodiment, HLR functionality is integrated into the mobile switching centers, as MSCs 125 (with I-HLRs). As discussed in greater detail below, the system 200 with I-HLR functionality within the MSC 125 may utilize different messaging types for implementation of the present invention, and in all other respects is identical to the system 100 illustrated in FIG. 1.

In accordance with the present invention, the MSCs 115 or 125 are also coupled to each other through a packet-based channel, line or network, such as ATM link 165, which may be any type of medium, such as a fiber optic, cable or other physical medium for providing an ATM link. In the preferred embodiment, the MSCs 115 and 125 are also linked to base stations (or other wireless transceivers) 145, preferably via currently employed frame relay links 170 or other packet based systems (such as ATM) (when backwards compatibility is not required). The base stations 145, in turn, provide a wireless communications link from the MSCs 115 or 125 to the various mobile units 130, such as cellular, PCS or other wireless telephones, personal digital assistants or other wireless devices, within particular geographic regions, for voice and data communications. The wireline switching center 105 is also generally connected to a plurality of telephones 140 or other customer premise equipment, also for voice and data communications. In addition, while the wireline (105) and mobile switching centers 115 and 125 are usually physically separated due to regulatory and other historical reasons, these switching centers may also be combined into one or more switching centers having both wireline and wireless functionalities.

Continuing to refer to FIGS. 1 and 2, any of the MSCs 115 or 125, for any given mobile unit 130, may be operating as a gateway MSC in accordance with the present invention. More specifically, each mobile unit 130 is generally assigned to a particular MSC (115 or 125), referred to as its home MSC, with information pertaining to that mobile unit 130 stored in a corresponding HLR, such as within an S-HLR 155 associated with the home MSC 115 or within an I-HLR of a home MSC 125. Such information, for example, may include calling features and services available to that particular mobile unit 130. Through the various corresponding base stations 145 or other wireless transceivers, each MSC 115 or 125 generally provides mobile telecommunication and other services to mobile units 130 within a particular geographic region or range. As each mobile unit 130 may roam throughout or traverse a geographic region, it may move out of the range of a particular MSC (115 or 125) and its corresponding base stations 145, and into the range of another MSC (115 or 125) with its corresponding base stations 145, with a corresponding hand off of an ongoing communication session between the MSCs (115 or 125) (via base stations 145). (Additional hand offs may also occur between base stations 145 connected to the same MSC 115 or 125).

As a consequence, when an MSC 115 or 125 is providing telecommunication and other services to a mobile unit 130 that has roamed into its range or geographic region (i.e., within range of any of its corresponding base stations 145), that MSC (115 or 125) is referred to as a serving MSC. A roaming mobile unit 130 may both initiate outgoing calls and receive incoming calls while within the range of any given serving MSC. Such a serving MSC typically stores and maintains information pertaining to such roaming mobile units within the visitor database (VLR) of its associated HLR, such as a S-HLR 155 associated with an MSC 115 or an I-HLR of an MSC 125.

In accordance with the present invention, for any given mobile unit 130, a home MSC 115 or 125 will generally operate as a gateway MSC while one of its assigned mobile units 130 is in another, different geographic area and is being served by a serving MSC. Any MSC 115 or 125 may function as a gateway MSC for a particular mobile unit 130, provided that it has a complete database for that mobile unit 130 and is able (or assigned) to route incoming calls for that mobile unit 130. As a consequence, any given MSC 115 or 125 may be both a gateway MSC and a serving MSC during the same period of time: an MSC 115 or 125 operates as a gateway MSC when providing services to its own assigned (or home) mobile units 130 which have roamed into another region, as discussed in greater detail below; and an MSC 115 or 125 operates as a serving MSC when providing services to any mobile unit 130 within its region or range (both visiting and home mobile units 130).

The gateway functionality referred to above, in accordance with the present invention, allows a gateway home or anchor) MSC 115 or 125 to retain control over all incoming and outgoing calls to and from its assigned (or home) mobile units 130. This gateway functionality, therefore, allows the gateway MSC 115 or 125 to implement advanced calling features, such as call waiting or three-way calling, regardless of the current location of any of its mobile units 130. As discussed in greater detail below, such control is maintained by creating (or routing) a voice path between a serving MSC and a gateway MSC through a packet network, such as through an ATM network or link 165. During call set up, a gateway MSC reserves or designates an address, utilizing a new parameter referred to as a data link connection identifier ("DLCI"), for use for all voice and data packets for that call (i.e., traffic or bearer traffic) to be transmitted to the gateway MSC from a serving MSC over the packet network. The new DLCI parameter is preferably requested and transmitted in new message forms, respectively referred to as a gateway origination request and gateway origination return result. In the preferred embodiment, the gateway origination request and return result messages are extensions compatible with the ANSI-41 protocol or standard promulgated by the American National Standards Institute.

For example, for an outgoing call from a mobile unit 130, the serving MSC (115 or 125) (via its S-HLR or I-HLR) obtains a DLCI from the gateway MSC (115 or 125). The outgoing call is then created or routed through the gateway MSC (115 or 125), by transmitting voice packets having the DLCI as an address or header from the serving MSC to the gateway MSC via a packet network or link, such as via ATM link 165. During this time, the gateway MSC (115 or 125) may also receive an incoming call for the particular mobile unit 130; due to its control over the outgoing call, the gateway MSC may provide an alert to the mobile unit 130 such as a call waiting signal, may provide a call forwarding on busy, or may create a three-way (barge-in) communication session. Call flows and messaging for such call control and routing are discussed in greater detail below with reference to FIGS. 4 through 7.

Figure 3:
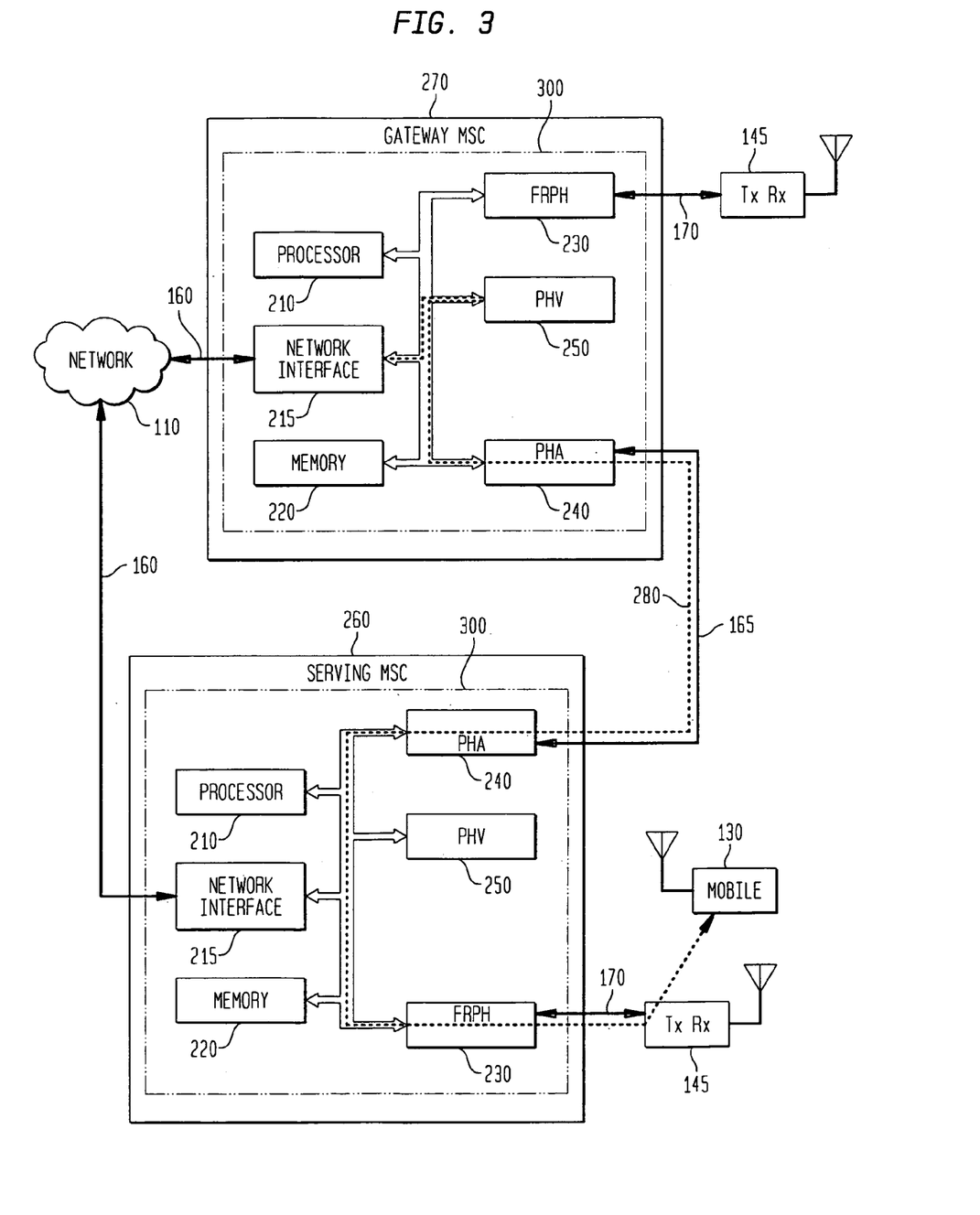
FIG. 3 is a block diagram illustrating an apparatus embodiment to maintain call control at a gateway mobile switching center utilizing a packet network in accordance with the present invention.

FIG. 3 is a block diagram illustrating an apparatus embodiment 300 to maintain call control at a gateway MSC utilizing a packet network in accordance with the present invention. In the preferred embodiment, the apparatus 300 is included within an MSC 115 or 125, such as within the gateway MSC 270 or serving MSC 260 illustrated in FIG. 3. The apparatus 300 includes a processor 210, a network interface 215, a memory 220, and protocol handlers for various packet-based protocols, depending upon the system 100 or 200 implementation, such as a frame relay protocol handler ("FRPH") 230, a protocol handler for voice ("PHV") 250, and a protocol handler for ATM ("PHA") 240.

Referring to FIG. 3, the network interface 215 is utilized to receive and transmit voice information and other data, control messages, call set up messages, and other pertinent information, to and from the network 110, and is typically designed to interface with a circuit switched network. The memory 220 may be a magnetic hard drive, an optical storage device, an integrated circuit, or any other type of data storage apparatus. The memory 220 is used to store information pertaining to program instructions or configurations (discussed below), call management and call routing information, and may include database (HLR and VLR) functionality, particularly when an HLR is implemented as an I-HLR within an MSC 125. Alternatively, in performing such HLR and VLR information storage and functionality, the memory 220 may be included within a stand-alone database, such as an S-HLR 155.

Continuing to refer to FIG. 3, the processor 210 may include a single integrated circuit ("IC"), or may include a plurality of integrated circuits or other components connected, arranged or grouped together, such as microprocessors, digital signal processors ("DSPs"), application specific integrated circuits ("ASICs"), field programmable gate arrays ("FPGAs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIGS. 4 through 7, with associated memory, such as microprocessor memory or additional RAM, DRAM, SRAM, MRAM, ROM, EPROM or $E^2$ ROM. The processor 210 with its associated memory may be configured to perform the methodology of the invention, as discussed above with reference to FIGS. 1 and 2 and as discussed below with reference to FIGS. 4 through 7. For example, the methodology may be programmed and stored, in the processor 210 with its associated memory (and/or memory 220) and other equivalent components, as a set of program instructions (or equivalent configuration or other program) for subsequent execution when the processor 210 is operative (i.e., powered on and functioning). (Equivalently, when the processor 210 with its associated memory and other equivalent components are implemented in whole or part as FPGAs and/or ASICs, the FPGAs or ASICs also may be designed, configured or hard-wired to implement the methodology of the invention).

Continuing to refer to FIG. 3, in the preferred embodiment, the apparatus 300 includes a frame relay protocol handler (FRPH) 230 as an interface to the base stations 145 through a frame relay link 170. (In lieu of FRPH 230, other equivalent, packet based protocol handlers may also be used, depending upon the available links or channels to the various base stations 145, such as ATM links). Also in the preferred embodiment, voice information from mobile units 130 is subrate sampled by the base stations 145 at 8K bits/second; the subrate samples are transmitted to the MSC 115 or 125 (such as serving MSC 260) via frame relay link 170, and are converted to full rate (64K bits/second) utilizing the protocol handler for voice (PHV) 250. The apparatus 300 further includes a protocol handler for ATM (PHA) 240, to maintain call control functionality within the gateway MSC 270, when the various MSCs 115 and 125, such as gateway MSC 270 and serving MSC 260, are connected via an ATM link 165. Alternatively, in the event the MSCs 115 and 125 are connected through a different type of packet link, a corresponding protocol handler should be utilized in lieu of PHA 240, such as an Internet protocol (IP) handler.

To illustrate the ATM or other packet link between the serving MSC 260 and the gateway MSC 270, a full duplex voice path 280 (dotted line) between the MSCs is illustrated in FIG. 3. During call set up, the gateway MSC 270 reserves a channel of its PHV 250 and provides the serving MSC 260 (via HLR functionality) with a specific address for the reserved channel of the PHV 250, referred to as a data link connection identifier ("DLCI"). The serving MSC 260, in turn, provides the DLCI to the base station 145 serving the mobile unit 130. Beginning with the mobile unit 130, a wireless link is created to the base station 145 which, in turn, transmits subrate voice packets to the FRPH 230 (in serving MSC 260) via frame relay link 170, with addressing designating the DLCI of the PHV 250 (in the gateway MSC 270). These frame relay voice packets are transferred to the PHA 240 within the serving MSC 260, which provides the appropriate ATM formatting and addressing for the PHA 240 in the gateway MSC 270. The ATM packets are transmitted over the ATM link 165 to the PHA 240 of the gateway MSC 270; the ATM layer is stripped, and the frame relay packets are delivered to the DLCI address of the PHV 250 (of the gateway MSC 270). From the PHV 250, the packets are converted to full rate (e.g., 64K/second for PCM), and transferred to the network interface 215 for transmission via the network 110.

Similarly, for incoming voice from the network, the PHV 250 of the gateway MSC 270 is provided with an address for the base station 145, with a different address for each call handled by the base station 145. Those voice packets or frames are provided with ATM formatting and addressing, for transmission over ATM link 165 to the serving MSC 260 and (via frame relay) to the serving base station 145 for wireless transmission to the mobile unit 130.

As mentioned above, as a mobile unit 130 traverses a given geographic region, it may move in or out of range of base stations 145 associated with a given MSC 115 or 125. As it does so, the mobile unit 130 typically registers with the MSC 115 or 125 providing service in the newly entered geographic region. During such registration, a serving MSC 125 receives database information from the gateway (or home) MSC 125 with I-HLR, and generates a corresponding VLR for the particular mobile unit, such as call handling instructions and triggers. For MSCs 115 with stand-alone HLRs (S-HLRs 155), the serving MSC 115 typically transmits a registration notification (ANSI-41 RegistrationNotification Invoke) to the S-HLR 155, and in response (ANSI-41 RegistrationNotification Return Result) receives this database information and also generates a corresponding VLR for the particular mobile unit, such as call handling instructions and triggers. In the preferred embodiment, a second VLR is also generated at the gateway MSC 115 or 125 by the S-HLR or I-HLR. More specifically, following transmission of the registration notification response to the serving MSC 115, the S-HLR 155 also transmits a qualification directive to the gateway MSC 115, which directive includes the VLR database information for the roaming mobile unit 130. Alternatively, a static VLR may be maintained at the gateway MSC 115, and updated by the S-HLR only when VLR impacting changes are made, such as to change an end user feature code or an administrative data entry. Following such a transmission of either the VLR database information or changes to the VLR database, the gateway MSC 115 transmits a qualification directive return result as an acknowledgement to the S-HLR. This second copy of the VLR at the gateway MSC 115 or 125 enables the gateway MSC to determine whether the roaming mobile unit 130 will have ATM voice path capability for incoming and outgoing calls. This second copy of the VLR at the gateway MSC 115 or 125 also provides a significant contrast with the prior art in which only one copy of a VLR is maintained and only at a serving MSC.

As mentioned above, and as discussed in greater detail below, a new DLCI parameter and a new message type with a corresponding response are utilized in the preferred embodiment. The DLCI parameter may be included as a new parameter within a wide variety of ANSI-41 compatible messages types, such as location requests (with corresponding location request return results) and routing requests (with corresponding routing request return results). In addition, two new messages are also defined for the preferred embodiment: first, a "gateway origination request" (or "gateway origination request invoke") is utilized by a serving MSC to request a DLCI to establish the ATM voice path, and second, a corresponding response referred to as a "gateway origination request return result" which includes the DLCI of the reserved channel of the PHV of the gateway MSC. The gateway origination request (invoke) preferably includes ANSI-41 parameters such as Billing ID, Dialed Digits, Electronic Serial Number, Mobile Identification Number, Originating MSC Identification (MSCID) (i.e., identification of the serving MSC which is originating an outgoing call from a mobile unit 130), and optionally includes parameters such as Serving Cell ID and Service Option (containing voice coder (vocoder) specific information for a particular call). The gateway origination request return result optionally includes the new DLCI parameter and other ANSI-41 parameters such as Access Denied Reason and Service Option. The various existing parameters are referenced in the subsections comprising section 6.5.2 of the ANSI-41 specification.

Figure 4:
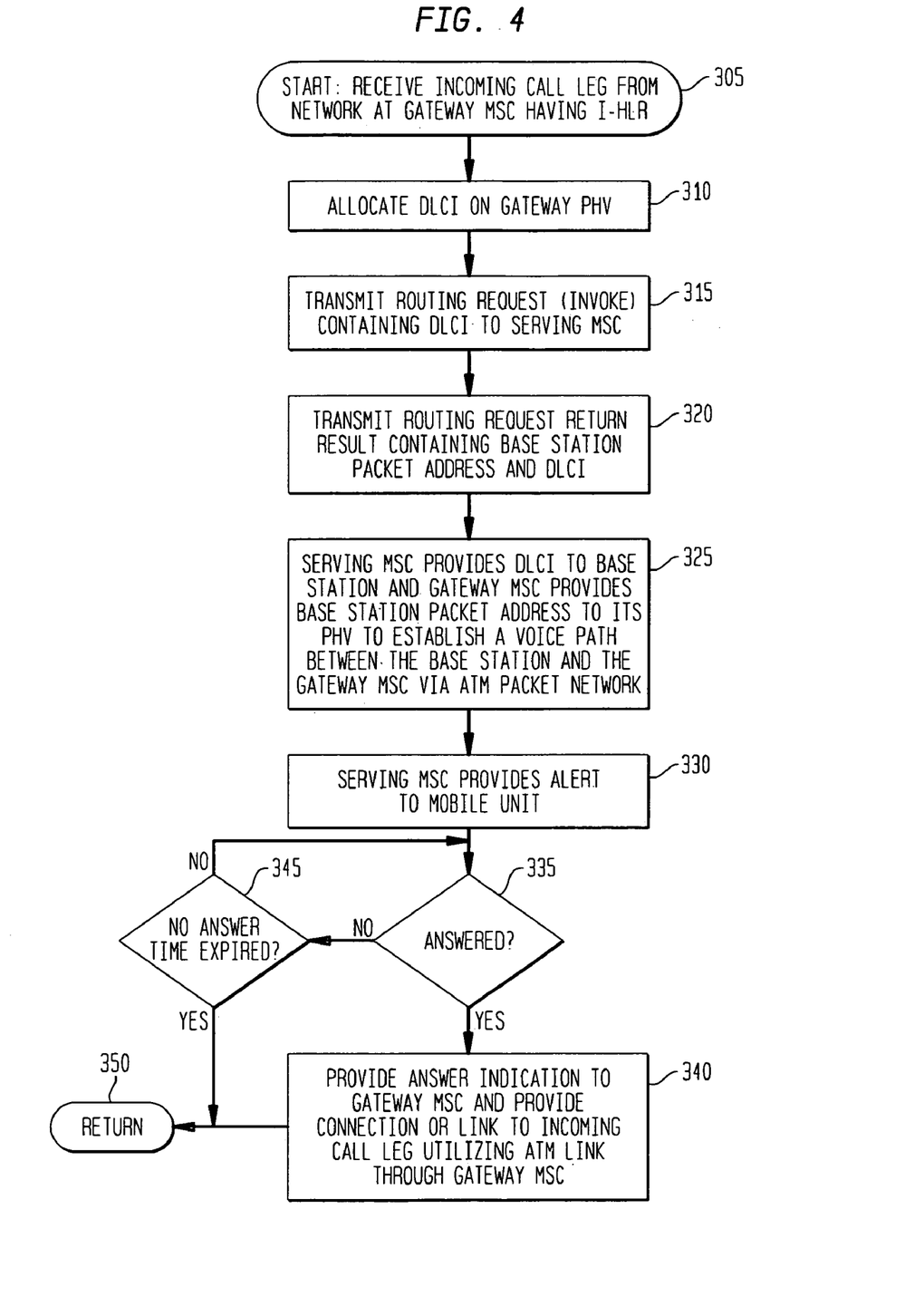
FIG. 4 is a flow diagram illustrating a method embodiment to maintain call control at a gateway mobile switching center having an integrated HLR, utilizing a packet network, for incoming calls in accordance with the present invention.

FIG. 4 is a flow diagram illustrating a method embodiment to maintain call control at a gateway mobile switching center 125 having an integrated HLR, utilizing a packet network, for incoming calls from a network 110 in accordance with the present invention. The method begins, step 305, with the reception of an incoming call leg (from the network 110) by the gateway MSC 125 (having an I-HLR) for a particular roaming mobile unit 130. The gateway MSC 125 reserves or allocates a channel on its PHV 250 having a corresponding or designated DLCI for addressing, step 310. With the I-HLR and VLR, the gateway MSC knows where the mobile unit 130 is registered, and as a consequence, the gateway MSC 125 then transmits a routing request invoke message containing the DLCI parameter (and identification of the mobile unit 130) to the serving MSC (115 or 125), step 315. Following a page to and response from the mobile unit 130, the serving MSC 115 or 125 transmits to the gateway MSC 125 a routing request return result (also including the DLCI parameter and a base station 145 address for packets from the gateway PHV 250 for the mobile unit 130), step 320. (In the event the serving MSC 115 or 125 determines not to utilize the ATM link, it will return a temporary location directory number (TLDN) for routing the call over circuit trunk facilities as is currently known in the art, instead of the DLCI parameter.)

Continuing to refer to FIG. 4, the serving MSC 125 provides the DLCI to the base station 145 that transmits to and receives from the particular mobile unit 130, and the gateway MSC 125 (via processor 210) provides the base station packet address to its PHV 250, step 325, to establish the traffic or bearer path between the base station 145 and the gateway MSC 125 utilizing the ATM link 165 (or other ATM network). The serving MSC 125 (via base station 145) provides an alert to the mobile unit 130, step 330, and when answered in step 335, provides an answer indication message to the gateway MSC 125 and provides a connection or link to the incoming call leg utilizing the ATM link 165, step 340. Packets from the mobile unit 130 are addressed to the DLCI of the gateway PHV 250, and packets from the PHV 250 are addressed to a call-specific address of the base station 145. Following step 340, the method may end, return step 350. In the event the call is unanswered in step 335, and after a predetermined period of time (no answer time) has elapsed in step 345, the method may also end, return step 350.

Figure 5:
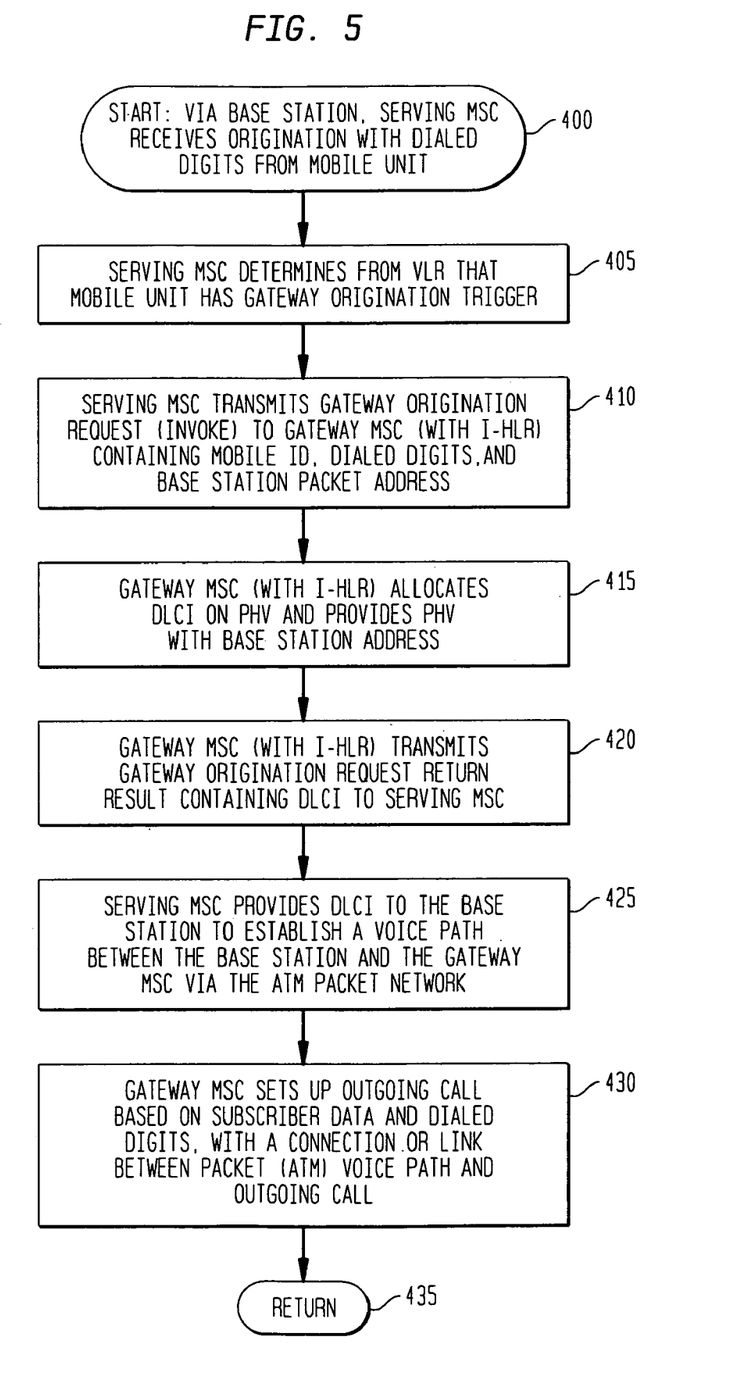
FIG. 5 is a flow diagram illustrating a method embodiment to maintain call control at a gateway mobile switching center having an integrated HLR, utilizing a packet network, for outgoing calls in accordance with the present invention.

FIG. 5 is a flow diagram illustrating a method embodiment to maintain call control at a gateway mobile switching center 125 having an integrated HLR, utilizing a packet network, for outgoing calls from roaming mobile unit 130 in accordance with the present invention. The method begins, step 400, with the reception by the serving MSC 125 of a request (origination) from a roaming mobile unit 130 (transmitted via base station 145), such as through the entry of dialed digits for an outgoing call (followed by entry of SEND or TALK). The serving MSC 125 determines, from its VLR, that the particular mobile unit has a gateway origination trigger, step 405, and as a consequence, the serving MSC 125 transmits a gateway origination request (invoke) (containing the identification of the mobile unit 130, the dialed digits, the service option (such as a PHV selection (such as for CDMA or TDMA)), the base station 145 address for the call, and other parameters) to the gateway MSC 125, step 410.

Continuing to refer to FIG. 5, upon reception of the request, the gateway MSC 125 reserves a channel and allocates an address (DLCI) on its PHV 250, step 415, to provide call control at the gateway MSC 125 and to provide feature interactions for incoming calls, such as call waiting or three-way calling, and provides the PHV 250 with a base station 145 address for the particular call. Next, in step 420, the gateway MSC 125 transmits a gateway origination request return result, containing the DLCI and other parameters, to the serving MSC 125. The serving MSC 125, in turn, provides the DLCI to the base station 145 serving the mobile unit 130, step 425, to establish the voice path through the ATM link 165. The gateway MSC 125 then sets up the outgoing call to the network 110 based upon subscriber data and the dialed digits, with a connection or link to the ATM voice path to the outgoing call, step 430. Packets from the mobile unit 130 are addressed to the DLCI of the gateway PHV 250, and packets from the PHV 250 are addressed to a call-specific address of the base station 145. Following step 430, the method may end, return step 435

Figure 6:
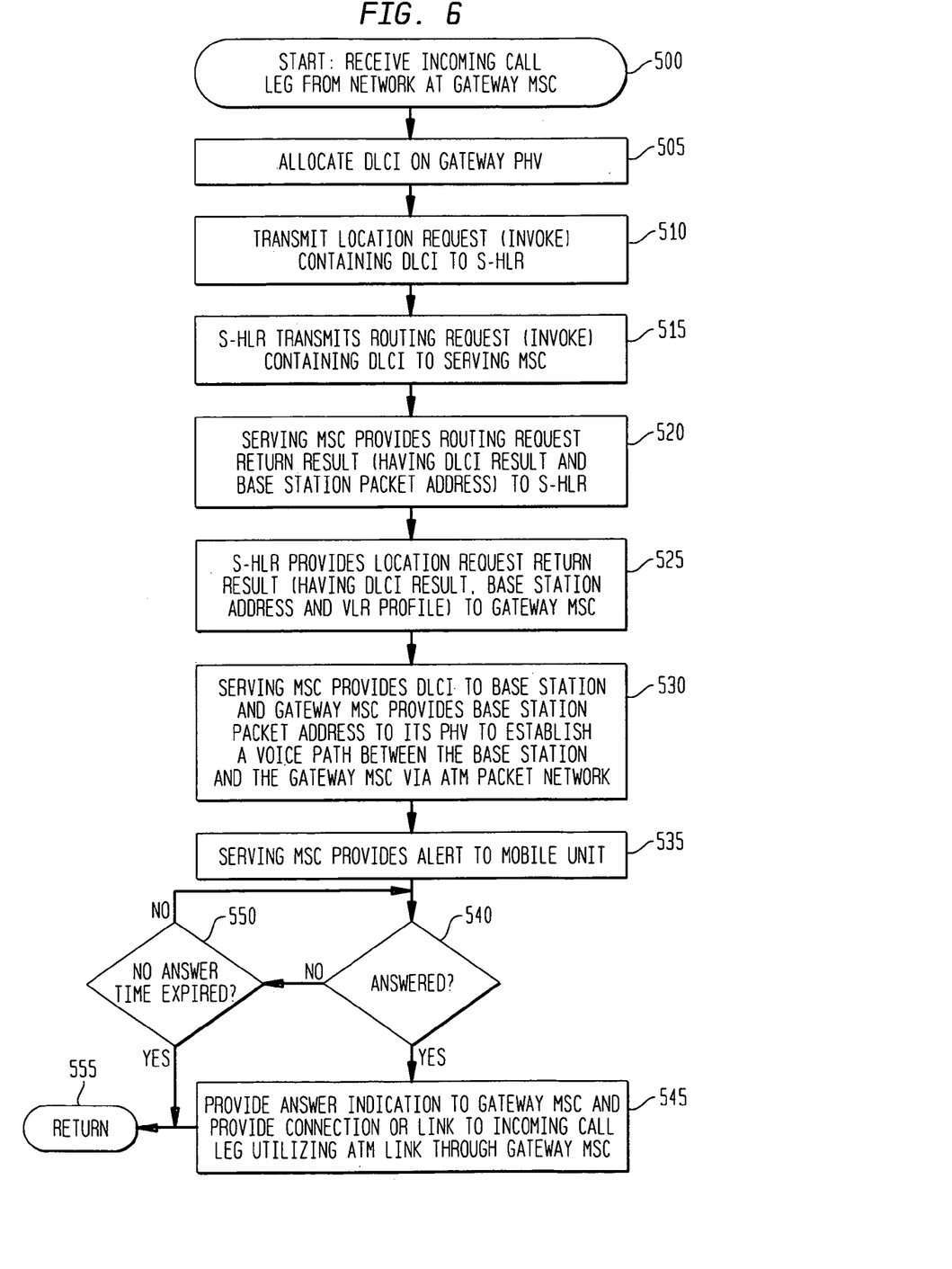
FIG. 6 is a flow diagram illustrating a method embodiment to maintain call control at a gateway mobile switching center having a stand-alone HLR, utilizing a packet network, for incoming calls in accordance with the present invention.

As mentioned above, the call flow diagrams for MSCs 115 having stand-alone HLRs (FIGS. 6 and 7) are slightly different than the cases (FIGS. 4 and 5) involving integrated HLRs. FIG. 6 is a flow diagram illustrating a method embodiment to maintain call control at a gateway mobile switching center 115 having a stand-alone HLR 155, utilizing a packet network, for incoming calls from a network 110 in accordance with the present invention. The method begins, step 500, with the reception of an incoming call leg (from the network 110) by the gateway MSC 115 (with VLR) for a particular roaming mobile unit 130. The gateway MSC 115, through information stored in its VLR, knows that the particular roaming mobile unit 130 is registered with a serving MSC that may be able to support packet network call delivery, and as a consequence, the gateway MSC 115 reserves or allocates a channel on its PHV 250 having a corresponding or designated DLCI for addressing, step 505. The gateway MSC 115 then transmits a location request invoke message containing the DLCI parameter (and identification of the mobile unit 130) to the S-HLR 155, step 510. The S-HLR 155 then transmits a routing request invoke message containing the DLCI parameter (and identification of the mobile unit 130) to the serving MSC 115, step 515.

Continuing to refer to FIG. 6, following a page to and response from the mobile unit 130, the serving MSC 115 transmits a routing request return result (also including the DLCI parameter and a base station 145 address for the particular call) to the S-HLR 155, step 520. (In the event the serving MSC 115 determines not to utilize the ATM link, it will return a temporary location directory number (TLDN) for routing the call over circuit trunk facilities as is currently known in the art, instead of the DLCI parameter.) The S-HLR 155 then transmits to the gateway MSC 115 a location request return result, containing the DLCI (or TLDN), the base station 145 packet address, and the VLR database profile, step 525. The serving MSC 115 then provides the DLCI to the base station 145 which transmits to and receives from the particular mobile unit 130, and the gateway MSC 115 provides the base station packet address to its PHV 250, step 530, to establish the voice path between the base station 145 and the gateway MSC 115 utilizing the ATM link 165. The serving MSC 115 (via base station 145) provides an alert to the mobile unit 130, step 535, and when answered in step 540, provides an answer indication message to the gateway MSC 115 and provides a connection or link to the incoming call leg utilizing the ATM link 165, step 545. Packets from the mobile unit 130 are addressed to the DLCI of the gateway PHV 250, and packets from the PHV 250 are addressed to a call-specific address of the base station 145. Following step 545, the method may end, return step 555. In the event the call is unanswered in step 540, and after a predetermined period of time (no answer time) has elapsed in step 550, the method may also end, return step 555.

Figure 7:
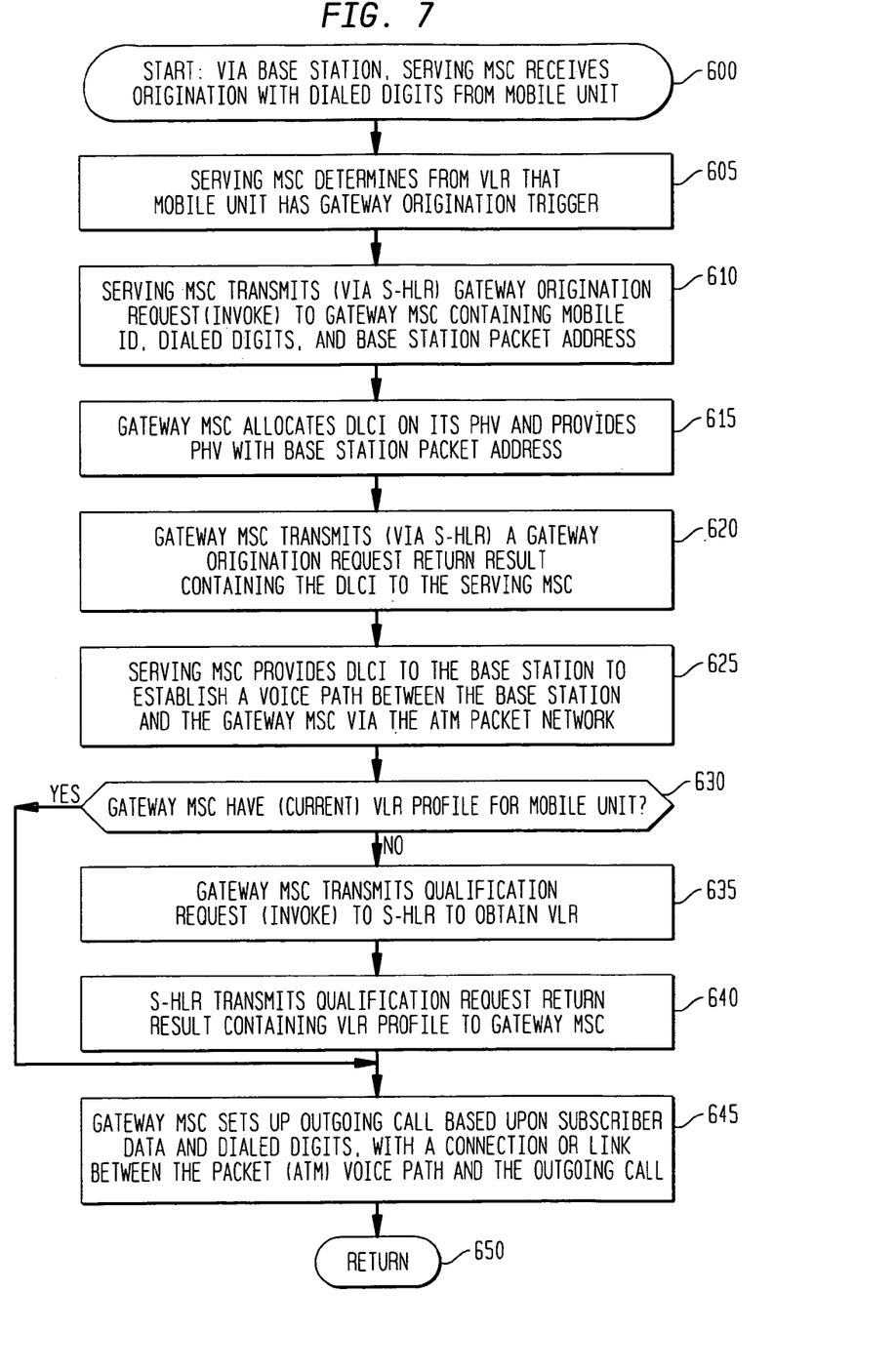
FIG. 7 is a flow diagram illustrating a method embodiment to maintain call control at a gateway mobile switching center having a stand-alone HLR, utilizing a packet network, for outgoing calls in accordance with the present invention.

FIG. 7 is a flow diagram illustrating a method embodiment to maintain call control at a gateway mobile switching center 115 having a stand-alone HLR 155, utilizing a packet network, for outgoing calls from roaming mobile unit 130 in accordance with the present invention. The method begins, step 600, with the reception by the serving MSC 115 of a request (origination) from a roaming mobile unit 130 (transmitted via base station 145), such as through the entry of dialed digits for an outgoing call (followed by entry of SEND or TALK). The serving MSC 115 determines, from its VLR, that the particular mobile unit has a gateway origination trigger, step 605, and as a consequence, the serving MSC 115 transmits (via the S-HLR 155) a gateway origination request (invoke) (containing the identification of the mobile unit 130, the dialed digits, the base station 145 address for the particular call, the service option (such as a PHV selection (such as for CDMA or TDMA)) and other parameters) to the gateway MSC 115, step 610.

Continuing to refer to FIG. 7, upon reception of the request, the gateway MSC 115 reserves a channel and allocates an address (DLCI) on its PHV 250, and provides its PHV 250 with the base station packet address, step 615, to provide call control at the gateway MSC 115 and to provide feature interactions for incoming calls, such as call waiting or three-way calling. Next, in step 620, the gateway MSC 125 transmits (via the S-HLR 155) a gateway origination request return result, containing the DLCI and other parameters, to the serving MSC 115. The serving MSC 115, in turn, provides the DLCI to the base station 145 serving the mobile unit 130, step 625, to establish the voice path through the ATM link 165. In the event that the gateway MSC 115 does not have a current VLR profile for the roaming mobile unit 130, step 630, the gateway MSC 115 then transmits a qualification request invoke to the S-HLR 155 to obtain the VLR profile, step 635. The S-HLR 155 then transmits to the gateway MSC 115 a qualification request return result containing the VLR profile of the roaming mobile unit 130, step 640. The gateway MSC 115 then sets up the outgoing call to the network 110 based upon subscriber data and the dialed digits, with a connection or link to the ATM voice path to the outgoing call, step 645. Packets from the mobile unit 130 are addressed to the DLCI of the gateway PHV 250, and packets from the PHV 250 are addressed to a call-specific address of the base station 145. Following step 645, the method may end, return step 650.

Following the establishment of an incoming or outgoing call through the gateway MSC (115 or 125), as illustrated in FIGS. 4–7, the gateway MSC may maintain control over any advanced calling features for the mobile unit 130, such as call waiting, call forwarding on busy, busy signal, three-way calling, etc. For example, for call waiting, in the event of a new incoming call from the network 110, the gateway MSC (115 or 125) may transmit an Information Forward message to the serving MSC (115 or 125), which then provides an in-call alert to the mobile unit 130. Conversely, for mobile unit 130 initiated features, such as three-way calling, the mobile unit 130 may provide feature actions to the serving MSC (115 or 125), such as through entry of a flash or a flash with other information. The serving MSC (115 or 125) then transmits a flash request invoke to the gateway MSC (115 or 125), and the gateway MSC (115 or 125) then provides these features, such as three-way calling.

Numerous advantages of the present invention may be apparent from the above discussion. As indicated above, call control is maintained at the gateway MSC, providing the ability to implement and control advanced calling features for roaming mobile units, especially those features presented as a "line appearance" to the gateway MSC for a particular mobile unit. In addition, toggling (or switching) between multiple calls, such as in call waiting, is performed at a central location, as may be required by various service providers. Another advantage of the various embodiments of the present invention is the utilization of a packet network, such as ATM link 165, rather than circuit switched trunk lines, to create a voice path between serving and gateway MSCs. As a consequence, trunking lines are available for other services, with a corresponding increase in system capacity. In addition, the various embodiments are user friendly and user transparent.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method for maintaining call control at a gateway mobile switching: center for a roaming mobile unit utilizing a packet network for bearer traffic transport, the method comprising:

(a) receiving an incoming call leg at the gateway mobile switching center for the roaming mobile unit;
   (b) determining a data link connection identifier for a protocol handler for voice at the gateway mobile switching center;
   (c) providing the data link connection identifier to a serving mobile switching center and to a base station, and obtaining from the serving mobile switching center a packet address of the base station for communication with the roaming mobile unit to create a packet link between the gateway mobile switching center and the base station;
   (d) providing an alert to the roaming mobile unit; and
   (e) when an answer has been received from the roaming mobile unit, providing a connection between the roaming mobile unit and the incoming call leg utilizing the packet link between the gateway mobile switching center and the base station.

2. The method of claim 1, wherein the data link connection identifier is included as a parameter within an ANSI-41 compatible message.

3. The method of claim 1, wherein step (c) further comprises:

transmitting a routing request invoke containing the data link connection identifier from the gateway mobile switching center to the serving mobile switching center; and
   receiving at the gateway mobile switching center a routing request return result containing the base station packet address from the serving mobile switching center.

4. The method of claim 1, wherein step (c) further comprises:

transmitting a location request invoke containing the data link connection identifier from the gateway mobile switching center to a stand-alone home location register;
   transmitting a routing request invoke containing the data link connection identifier from the stand-alone home location register to the serving mobile switching center;
   receiving at the stand-alone home location register a routing request return result containing the base station packet address and a data link connection identifier result from the serving mobile switching center; and
   receiving at the gateway mobile switching center a location request return result containing the base station packet address, the data link connection identifier result and a visitor location register profile from the stand-alone home location register.

5. The method of claim 1, wherein step (c) further comprises:

providing the base station packet address to the protocol handler for voice.

6. The method of claim 1, wherein the packet link is an asynchronous transfer mode (ATM) protocol link.

7. The method of claim 1, wherein the packet link is an Internet protocol (IP) link.

8. The method of claim 1, wherein the packet link is a frame relay protocol link.

9. The method of claim 1, wherein the packet link is an asynchronous transfer mode (ATM) protocol link between the gateway mobile switching center and the serving mobile switching center and is a frame relay protocol link between the serving mobile switching center and the base station.

10. The method of claim 1, further comprising, prior to step (a):
storing a visitor location register record for the roaming mobile unit at the gateway mobile switching center.

11. A method for maintaining call control at a gateway mobile switching center for a roaming mobile unit utilizing a packet network for bearer traffic transport, the method comprising:
(a) receiving an origination having dialed digits at a serving mobile switching center from the roaming mobile unit;
(b) providing to the gateway mobile switching center an identification of the roaming mobile unit, the dialed digits, and a packet address of a base station;
(c) determining a data link connection identifier for a protocol handler for voice at the gateway mobile switching center;
(d) providing the data link connection identifier to the serving mobile switching center and to the base station, to create a packet link between the gateway mobile switching center and the base station; and
(e) transmitting an outgoing call leg from the gateway mobile switching center and providing a connection between the outgoing call leg and the packet link for communication with the roaming mobile unit utilizing the packet link between the gateway mobile switching center and the base station.

12. The method of claim 11, wherein the data link connection identifier is included as a parameter within an ANSI-41 compatible message.

13. The method of claim 11, wherein step (b) further comprises:
transmitting a gateway origination request invoke containing the base station packet address, the mobile identification and the dialed digits, from the serving mobile switching center to the gateway mobile switching center.

14. The method of claim 11, wherein step (d) further comprises:
receiving at the serving mobile switching center a gateway origination request return result containing the data link connection identifier from the gateway mobile switching center.

15. The method of claim 11, wherein step (b) further comprises:
transmitting a gateway origination request invoke containing the base station packet address, the mobile identification and the dialed digits, from the serving mobile switching center, through a stand-alone home location register, to the gateway mobile switching center.

16. The method of claim 11, wherein step (d) further comprises:
receiving at the serving mobile switching center, through a stand-alone home location register, a gateway origination request return result containing the data link connection identifier from the gateway mobile switching center.

17. The method of claim 11, wherein step (c) further comprises:
providing the base station packet address to the protocol handler for voice.

18. The method of claim 11, wherein the packet link is an asynchronous transfer mode (ATM) protocol link.

19. The method of claim 11, wherein the packet link is an Internet protocol (IP) link.

20. The method of claim 11, wherein the packet link is a frame relay protocol link.

21. The method of claim 11, wherein the packet link is an asynchronous transfer mode (ATM) protocol link between the gateway mobile switching center and the serving mobile switching center and is a frame relay protocol link between the serving mobile switching center and the base station.

22. The method of claim 11 further comprising, prior to step (a):
storing a visitor location register record for the roaming mobile unit at the gateway mobile switching center.

23. A system for maintaining call control at a gateway mobile switching center for a roaming mobile unit utilizing a packet network for bearer traffic transport, the system comprising:
a serving mobile switching center, the serving mobile switching center operative to provide an alert to the roaming mobile unit;
a base station coupled to the serving mobile switching center for wireless communication with the roaming mobile unit, the base station operative to receive a connection link identifier from the serving mobile switching center; and
a gateway mobile switching center coupled to the serving mobile switching center, the gateway mobile switching center having a protocol handler for voice, the gateway mobile switching center operative, upon reception of an incoming call leg for the roaming mobile unit, to determine the data link connection identifier for the protocol handler for voice and to provide the data link connection identifier to the serving mobile switching center for transmission to the base station; the gateway switching center further operative to obtain from the serving mobile switching center a packet address of the base station for communication with the roaming mobile unit to create a packet link between the gateway mobile switching center and the base station; and following the alert to the roaming mobile unit, when an answer has been received from the roaming mobile unit, the gateway mobile switching center operative to provide a connection between the roaming mobile unit and the incoming call leg utilizing the packet link between the gateway mobile switching center and the base station.

24. The system of claim 23, wherein the data link connection identifier is included as a parameter within an ANSI-41 compatible message.

25. The system of claim 23, wherein the gateway mobile switching center is further operative to transmit a routing request invoke containing the data link connection identifier to the serving mobile switching center, and to receive a routing request return result containing the base station packet address from the serving mobile switching center.

26. The system of claim 23, further comprising:
a stand-alone home location register coupled to the serving mobile switching center and to the gateway mobile switching center.

27. The system of claim 26, wherein the gateway mobile switching center is further operative to transmit a location request invoke containing the data link connection identifier to the stand-alone home location register; the stand-alone home location register is operative to transmit a routing request invoke containing the data link connection identifier to the serving mobile switching center, and to receive a routing request return result containing the base station packet address and a data link connection identifier result from the serving mobile switching center; and wherein the gateway mobile switching center is further operative to receive a location request return result containing the base station packet address, the data link connection identifier result and a visitor location register profile from the stand-alone home location register.

28. The system of claim 23, wherein the gateway mobile switching center further includes a processor, the processor configured to provide the base station packet address to the protocol handler for voice.

29. The system of claim 23, wherein the packet link is an asynchronous transfer mode (ATM) protocol link.

30. The system of claim 23, wherein the packet link is an Internet protocol (IP) link.

31. The system of claim 23, wherein the packet link is a frame relay protocol link.

32. The system of claim 23, wherein the packet link is an asynchronous transfer mode (ATM) protocol link between the gateway mobile switching center and the serving mobile switching center and is a frame relay protocol link between the serving mobile switching center and the base station.

33. The system of claim 23, wherein the gateway mobile switching center stores a visitor location register record for the roaming mobile unit.

34. A system for maintaining call control at a gateway mobile switching center for a roaming mobile unit utilizing a packet network for bearer traffic transport, the system comprising:
a serving mobile switching center, the serving mobile switching center operative to receive an origination having dialed digits from the roaming mobile unit;
a base station coupled to the serving mobile switching center for wireless communication with the roaming mobile unit, the base station operative to receive a connection link identifier from the serving mobile switching center; and
a gateway mobile switching center coupled to the serving mobile switching center, the gateway mobile switching center having a protocol handler for voice, the gateway mobile switching center operative to receive from the serving mobile switching center an identification of the roaming mobile unit, the dialed digits, and a packet address of the base station, the gateway switching center further operative to determine the data link connection identifier for the protocol handler for voice and to providing the data link connection identifier to the serving mobile switching center to create a packet link between the gateway mobile switching center and the base station; and the gateway mobile switching center further operative to transmit an outgoing call leg and to provide a connection between the outgoing call leg and the packet link for communication with the roaming mobile unit.

35. The system of claim 34, wherein the data link connection identifier is included as a parameter within an ANSI-41 compatible message.

36. The system of claim 34, wherein the serving mobile switching center is further operative to transmit to the gateway mobile switching center a gateway origination request invoke containing the base station packet address, the mobile identification and the dialed digits.

37. The system of claim 34, wherein the gateway mobile switching center is further operative to transmit to the serving mobile switching center a gateway origination request return result containing the data link connection identifier.

38. The system of claim 34, further comprising:
a stand-alone home location register coupled to the serving mobile switching center and to the gateway mobile switching center.

39. The system of claim 38, wherein the serving mobile switching center is further operative to transmit a gateway origination request invoke, containing the base station packet address, the mobile identification and the dialed digits, through the stand-alone home location register to the gateway mobile switching center; and wherein the gateway mobile switching center is further operative to transmit a gateway origination request return result, containing the data link connection identifier, through the stand-alone home location register to the serving mobile switching center.

40. The system of claim 34, wherein the gateway mobile switching center further includes a processor, the processor configured to provide the base station packet address to the protocol handler for voice.

41. The system of claim 34, wherein the packet link is an asynchronous transfer mode (ATM) protocol link.

42. The system of claim 34, wherein the packet link is an Internet protocol (IP) link.

43. The system of claim 34, wherein the packet link is a frame relay protocol link.

44. The system of claim 34, wherein the packet link is an asynchronous transfer mode (ATM) protocol link between the gateway mobile switching center and the serving mobile switching center and is a frame relay protocol link between the serving mobile switching center and the base station.

45. The system of claim 34, wherein the gateway mobile switching center stores a visitor location register record for the roaming mobile unit.

46. An apparatus for maintaining call control at a gateway mobile switching center for a roaming mobile unit utilizing a packet network for bearer traffic transport, the roaming mobile unit having a wireless link to a base station, the base station coupled to a serving mobile switching center, the apparatus comprising:
a network interface for reception of an incoming call leg and for transmission of an outgoing call leg;
a protocol handler for voice;
a packet network protocol handler; and
a processor coupled to the network interface, to the protocol handler for voice, and to the packet network protocol handler, wherein the processor, when operative, is configured to determine a data link connection identifier for the protocol handler for voice and to provide the data link connection identifier to the serving mobile switching center; the processor further configured to receive a base station packet address from the serving mobile switching center and to provide the base station packet address to the protocol handler for voice to create a packet link between the packet network protocol handler and the base station; the processor further configured to provide a connection between the packet link and the incoming call leg for communication with the roaming mobile unit and to provide a connection between the packet link and the outgoing call leg for communication with the roaming mobile unit.

47. The apparatus of claim 46, wherein the processor is further configured to include the data link connection identifier as a parameter within an ANSI-41 compatible message.

48. The apparatus of claim 46, wherein the processor is further configured to transmit a routing request invoke containing the data link connection identifier to the serving mobile switching center, and to receive a routing request return result containing the base station packet address from the serving mobile switching center.

49. The apparatus of claim 46, further comprising a memory coupled to the processor, wherein the processor is further configured to transmit a location request invoke containing the data link connection identifier to a stand-alone home location register; wherein the processor is further configured to receive from the stand-alone home location register a location request return result containing the base station packet address, a data link connection identifier result and a visitor location register profile, and wherein the processor is further configured to store the visitor location register profile in the memory.

50. The apparatus of claim 46, wherein the processor is further configured to receive a gateway origination request invoke containing the base station packet address, the mobile identification and dialed digits for the outgoing call leg.

51. The apparatus of claim 46, wherein the processor is further configured to transmit a gateway origination request return result containing the data link connection identifier.

52. The apparatus of claim 46, wherein the packet network protocol handler is a protocol handler for asynchronous transfer mode (ATM) and wherein the packet link is an ATM protocol link.

53. The apparatus of claim 46, wherein the packet network protocol handler is a protocol handler for Internet protocol (IP) and wherein the packet link is an IP link.

54. The apparatus of claim 46, wherein the packet network protocol handler is a protocol handler for frame relay and wherein the packet link is a frame relay protocol link.

55. The apparatus of claim 46, wherein the packet network protocol handler is a protocol handler for asynchronous transfer mode (ATM) and wherein a first portion of the packet link is an asynchronous transfer mode (ATM) protocol link between the gateway mobile switching center and the serving mobile switching center and a second portion of the packet link is a frame relay protocol link between the serving mobile switching center and the base station.

56. The apparatus of claim 46, further comprising a memory coupled to the processor, wherein the memory stores a visitor location register record for the roaming mobile unit.

* * * * *